United States Patent [19]

Nelsen et al.

[11] 4,421,201

[45] Dec. 20, 1983

[54] HIGH EFFICIENCY BROADBAND ACOUSTIC RESONATOR AND ABSORPTION PANEL

[75] Inventors: Murray D. Nelsen, Goddard; Robert K. Kunze, Jr., Wichita, both of Kans.; Robert F. Olsen, Woodinville; Ira B. Rushwald, Seattle, both of Wash.

[73] Assignee: The Boeing Company, Seattle, Wash.

[21] Appl. No.: 306,677

[22] Filed: Sep. 29, 1981

[51] Int. Cl.³ .............................................. B64D 33/00
[52] U.S. Cl. .................................. 181/214; 181/286; 181/292; 428/116
[58] Field of Search .............. 181/214, 217, 218, 222, 181/286, 288, 292, 293; 428/116

[56] References Cited

U.S. PATENT DOCUMENTS 4,257,998 3/1981 Diepenbrock, Jr. et al. ... 181/286 X
4,265,955 5/1981 Harp et al. ...................... 181/292 X

*Primary Examiner*—Benjamin R. Fuller
*Attorney, Agent, or Firm*—Edwin H. Crabtree

[57] ABSTRACT

A high efficiency broadband acoustic resonator and absorption panel used for reducing engine noise from high bypass fan jet engines mounted on an aircraft. The panel uses a single layer of cellular honeycomb core with a pair of parallel acoustic septums formed internally in the core for attenuating high and medium frequency sounds during all engine operations as well as the low frequency combination tone and "buzzsaw" noise experienced during high power aircraft takeoff and cutback engine power settings.

5 Claims, 5 Drawing Figures

HIGH EFFICIENCY BROADBAND ACOUSTIC RESONATOR AND ABSORPTION PANEL

BACKGROUND OF THE INVENTION

This invention relates generally to a panel used for attenuating sound frequencies and more particularly but not by way of limitation to a cellular honeycomb core sandwich construction for installation in an engine nacelle or other applications requiring sound absorption.

Heretofore advanced technology sound attenuating panels in an engine nacelle have been constructed primarily using a double layer of honeycomb core with a septum bonded between the two layers. Facing material is then bonded on both sides of the double layer forming a core sandwich. This type of construction requires four bond lines which degrade from the strength of the sandwich construction. Further a double layer core construction was used for attenuating both high frequency sound and low frequency "buzzsaw" noise which required a short section of lining with increased depth causing significant fabrication complications. This type of construction required added weight due to both the additional depth of the core and special attachment flanges necessary to secure the two linings together.

Also, the surface area required by the additional "buzzsaw" lining is not effective for high frequency noise suppression. This resulted in a compromise between noise suppression of the low frequency "buzzsaw" noise and the high frequency broadband and tone noise.

The subject invention is an improved design utilizing a continuous buried septum which is described in U.S. Pat. No. 4,265,955 and U.S. Pat. No. 4,257,998. These patents disclose a honeycomb core with internal septum and a method of making a cellular core with internal septum. The patents are assigned to the assignee of interest of this application and the patent references cited during the prosecution of the above mentioned patents are incorporated herein by reference.

SUMMARY OF THE INVENTION

The improved absorption panel described herein has a single layer of cellular honeycomb core with a pair of parallel internal septums formed therein which provide particular acoustic absorption properties when compared to the double layer core sandwich absorption panel.

The improved panel efficiently attenuates both low, medium and high frequency sound from an engine fan noise sprectrum.

The structure of the improved panel forms a repetitive pattern of a double and triple layer resonators working in parallel.

The high efficiency broadband lining is designed to provide improved low frequency attenuation for the suppression of the "buzzsaw" noise experienced during high power takeoff and cutback engine power settings. Further, the high efficiency broadband lining maintains an attenuation level equal to or greater than peak attenuation of double layer designs by approximately two octaves.

Further the high efficiency broadband lining design will save approximately 40 lbs. weight per engine nacelle when compared to the double layer liner plus four inch deep "buzzsaw" nacelle inlet design. Additionally, the new liner design is easier and cheaper to manufacture, is more structurally sound and the design is anticipated to offer a greater noise suppression for the same lining length and treated area.

The improved sound attenuating panel for installation in the high velocity air flow region of an engine nacelle includes a single layer of honeycomb core having a first permeable sheet of facing material attached to the top of the core. A first acoustic septum is formed internally in the core at a desired depth and is parallel to the facing sheet. Further, a second acoustic septum is formed internally in the core and parallel to the first acoustic septum. The second acoustic septum is disposed in a spaced relationship below the facing sheet and the first acoustic septum.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
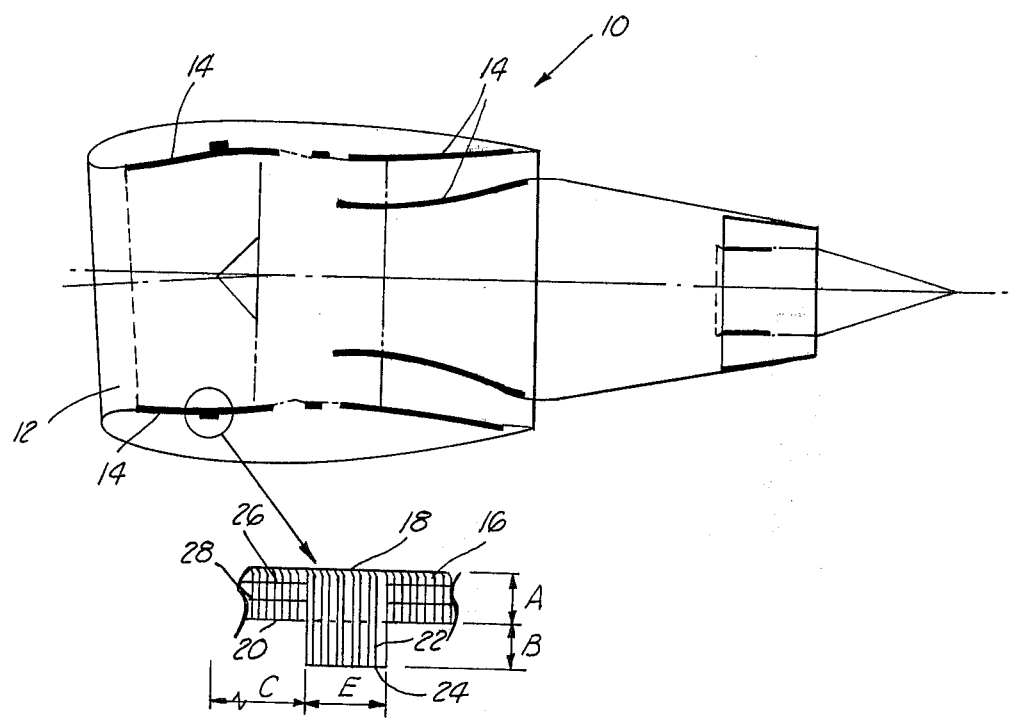
FIG. 1 illustrates a typical nacelle engine installation showing the location of an inlet lining.

In FIG. 1 a typical nacelle engine designated by general reference numeral 10 is shown having an inlet 12 and inlet lining 14 therearound. The inlet lining 14 is shown in greater detail in FIG. 2 having a double layer or "buzzsaw" arrangement for the attenuation of low, medium and high frequency ranges. This necessary noise suppression is now required to meet federal, state and community noise regulations in and around modern day airports.

Figure 2:
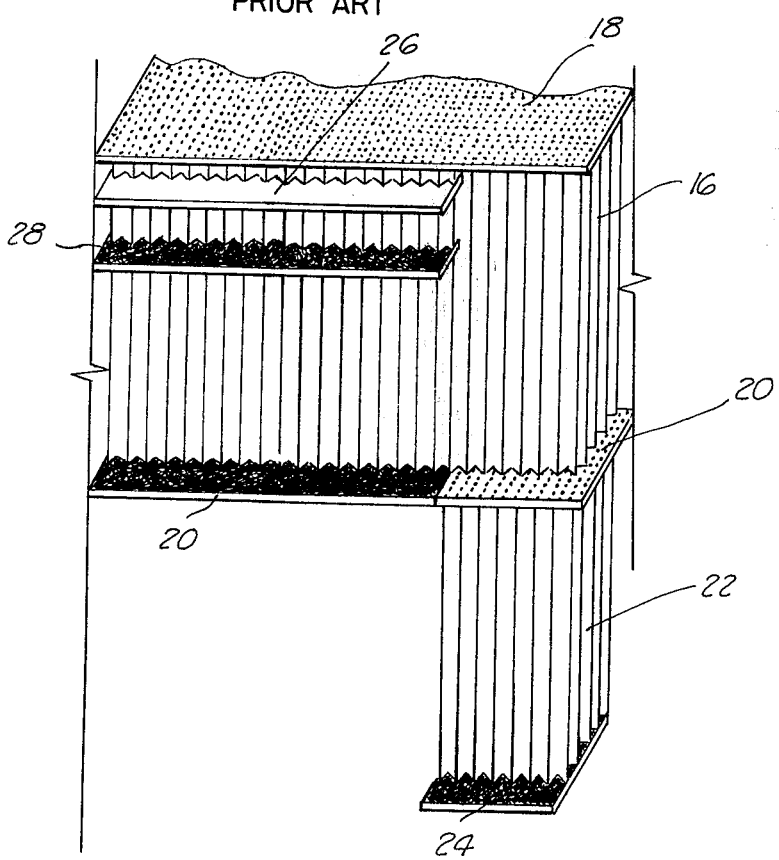
FIG. 2 is an enlarged view illustrating the construction of the "double layer or buzzsaw" lining arrangements.

Referring now to both FIG. 1 and FIG. 2 the double layer inlet nacelle lining 14 includes a first layer of cellular honeycomb core 16 having a first sheet 18 of permeable facing material attached to the top of the core 16. A second sheet 20 of facing material is attached to the bottom of the core 16. The second sheet 20 of facing material also is attached to the top of a second section of the lining 14 having a layer of cellular honeycomb core 22 with a third sheet 24 of facing material attached to the bottom of the core 22.

The first core 16 includes a first internal septum 26 and a second internal septum 28 disposed parallel to the facing sheet 18 and formed internally at a predetermined distance below the facing sheet 18 for attenuating both high and medium frequency sound. A typical depth "A" of the cellular core 16 is in the range of 2 inches and in order to attenuate the "buzzsaw" noise the short section of lining 14 requiring the addition of the core 22 includes additional depth "B" in a range of 2 inches providing an overall depth of 4 inches of the lining 14.

It should be noted that in FIGS. 1 and 2 the lining 14 is not drawn to scale and the overall length "C" of the core 16 is in the range of 27 to 36 inches while the overall length "E" of the core 22 is in the range of 8 inches.

The first facing sheet 18 is perforated and has a percent open area, i.e. POA, in the range of 16 percent. Also the first internal septum 26 is perforated having a POA of 1.2 percent. A portion of the second facing sheet 20 disposed above the second core 22 has a POA of 25 percent. The third facing sheet 24 is not perforated.

Figure 3:
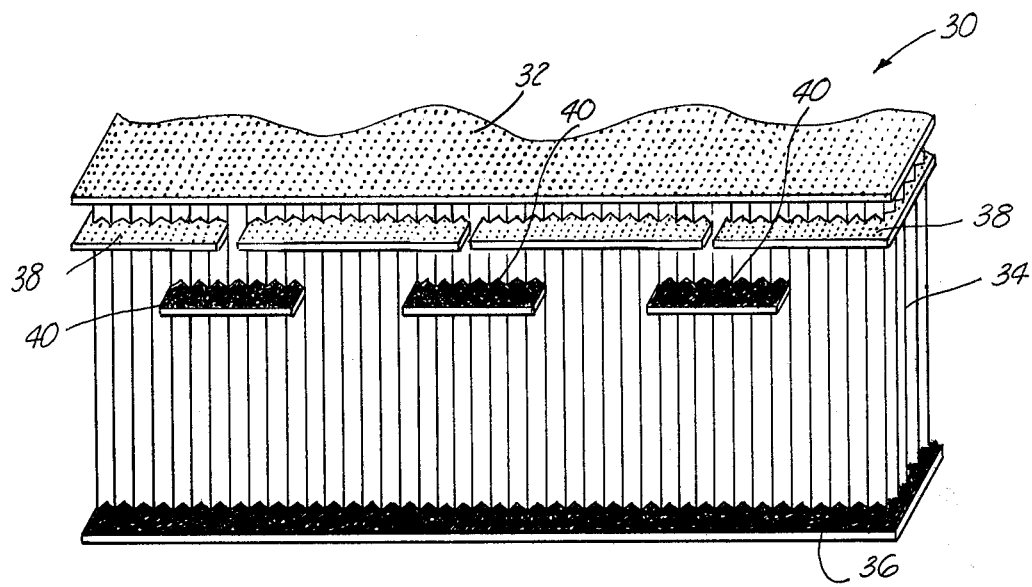
FIGS. 3 and 4 illustrate the improved sound attenuating panel using the parallel buried septum technique.
Figure 4:
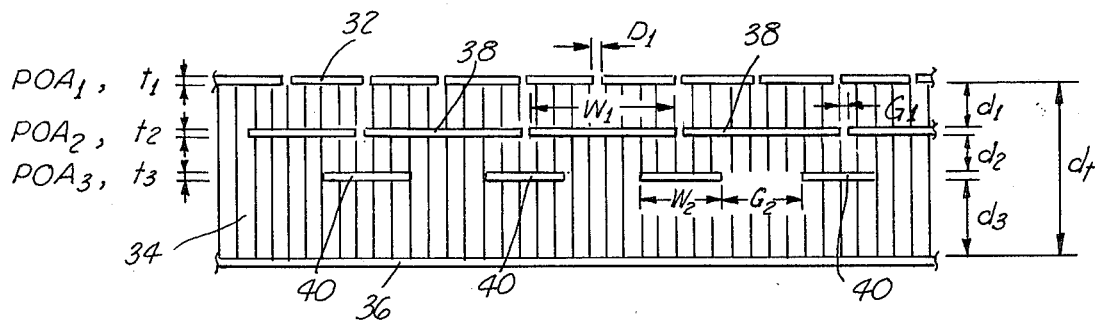
Figure 4:
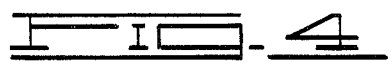

Referring now to FIGS. 3 and 4 the new improved sound attenuating panel designated by general reference numeral 30 is shown for installation in the high velocity air flow region as shown in FIG. 1 or any other applications requiring acoustic treatment. The new panel 30 was developed to efficiently attenuate both low, medium and high frequency fan engine noise and eliminate the need of the short section of lining 14 having the core 22 for attenuating "buzzsaw" noise. The panel 30 includes a permeable first sheet of facing material 32 attached to the top of a single layer of honeycomb core 34 with a second sheet 36 of facing material attached to the bottom of the core 34 for forming an acoustic structural sandwich.

The core 34 may have any commonly used honeycomb core designs such as flexcore, hexcore or the like with cell size typically in the range of $\frac{1}{8}$ to $\frac{1}{2}$ inch with the most commonly used size being approximately $\frac{3}{8}$ of an inch.

The permeable facing sheet 32 serves as an aerodynamic diffuser surface of the nacelle inlet and as the active surface of the acoustic absorption panel 30. The honeycomb core 34 serves as the structural panel and as acoustic partitions separating differently tuned resonating cavities formed by a first internally formed septum 38 and a second internally formed acoustic septum 40 which are disposed parallel to each other and below the first sheet 32. The first septum 38 may be continuous or formed in strips having a width $W_1$ with gaps $G_1$ therebetween. The second septum 40 is formed in strips having a width $W_2$ with gaps $G_2$ therebetween. The strips of the septum 38 and 40 are continuous through the cells of the core 34 and formed therearound in the lining 14 of the engine nacelle.

The permeable acoustic facing sheet 32 may be fabricated of commonly used facing sheet materials such as a perforated aluminum plate, polymide, epoxy glass laminate and the like.

The internal septums 38 and 40 are inserted into the honeycomb core 34 to predetermined depths established by the requirements of the acoustic design. The depth of the honeycomb core 34, the permeability of the septum 38, the width $W_1$ and $W_2$ of the septums 38 and 40 and the gap distance $G_1$ and $G_2$ between the strips of the septums 38 and 40 all can effect the acoustic performance of the completed panel 30. These parameters must be optimized or tailored for each acoustic application. Depending upon the particular application for an aircraft engine design the septum 38 may be continuous or as shown in FIGS. 3 and 4 formed in strips having gap $G_1$ therebetween. In this type of application the lower or second septum strips 40 are not perforated or porous. The resulting acoustic design of this geometry is effectively two differently tuned double layer designs coupled in parallel. The deep double layer resonators formed by the cells of the core 34 centered over gap $G_2$ work effectively on low frequency sound absorption. The shallow double layer resonators formed by the cells of the core 34 centered over width $W_2$ of the septum 40 work effectively on medium and high frequency sound absorption.

It can be appreciated that there are virtually an infinite number of design variations that can be used with the general configuration geometry as shown in FIGS. 3 and 4 without departing from the scope of the invention. In particular the needs of a specific acoustic application may be optimized by varying the parameters of the septum strips 38 and 40 by minimum and maximum ranges shown in the following Table A which also illustrates five test programs A through E. These tests successfully reduced in combination high, medium and low frequency noise using the single honeycomb core 34 of the panel 30 with the parallel internally formed septum strips 38 and 40.

TABLE A

| | A | B | C | D | E | Minimum to Maximum |
|---|---|---|---|---|---|---|
| $POA_1$ | 16.7 | 16.7 | 16.7 | 16.7 | 14 | 1 to 50 |
| $d_1$ | .354 | .354 | .354 | .354 | .3 | .1 to 2.0 |
| $t_1$ | .032 | .032 | .032 | .032 | .032 | .01 to .1 |
| $D_1$ | .05 | .05 | .05 | .05 | .05 | .01 to .25 |
| $POA_2$ | 2.9L | 2.9L | 2.4L | 2.9L | 1.0 | 0 to 10 |
| $d_2$ | .354 | .354 | .285 | .354 | .35 | .1 to 2.0 |
| $t_2$ | .03 | .03 | .03 | .03 | .03 | .01 to .1 |
| $D_2$ | .006 | .006 | .006 | .006 | .005 | .001 to .25 |
| $W_1$ | Cont. | Cont | 1.2 | Cont. | 1.35 | 0 to Cont. |
| $G_1$ | 0. | 0. | .3 | 0. | .062 | 0 to Cont. |
| $W_2$ | .7 | 1.4 | .7 | .7 | .75 | Cell width to cont. |
| $G_2$ | 1.3 | 2.6 | .8 | 1.3 | .60 | 0 to 10.0 |
| $d_t$ | 1.94 | 1.94 | 1.94 | 1.50 | 1.94 | .2 to 8.0 |
| $POA_3$ | 0 | 0 | 0 | 0 | .5 | 0 to 10 |
| $t_3$ | .03 | .03 | .03 | .03 | .03 | .01 to .1 |
| $D_3$ | 0 | 0 | 0 | 0 | .005 | .05 to .25 |

$POA_1$ = Estimate for installed value of face sheet 32 percent open area.
$POA_2$ = Estimate for installed percent open area of the buried septum 38.
$POA_3$ = Estimate for installed percent open area of the buried septum 40.
$D_2$ = Approximate buried septum hole diameter of septum 38.
$D_3$ = Approximate buried septum hole diameter of septum 40.

In FIG. 4, $d_1$, $d_2$ designate the distance between the top of the facing sheet 32 and the first buried septum 38 and the distance between buried septums 38 and 40. $d_3$ is the distance between the second septum 40 and the face sheet 36. $d_t$ is the total distance between the sheets 32 and 36.

It should be noted it is important the width $W_2$ of the septum 40 be greater than the width of the gap $G_1$ with the width $W_2$ centered or indexed below the gap $G_1$ to form the shallow double layer resonators thereabove.

Figure 5:
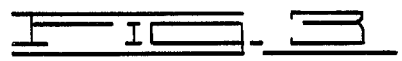
FIG. 5 illustrates an alternate embodiment of the second acoustic septum.
Figure 5:
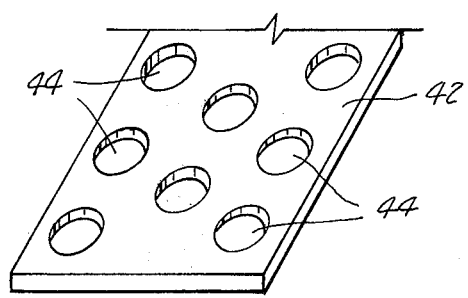

In FIG. 5 an alternate embodiment of the second septum 40 is shown and designated by reference numeral 42. In this septum 42 there are a plurality of circular cutouts 44 or openings therethrough. This configuration could be used equally well rather than having a plurality septum strips 40 as shown in FIGS. 3 and 4. Again, it should be appreciated there may be a number of geometric configurations of the parallel septums 38 and 40 having different widths and gaps therebetween and internal depths formed in the core 34 to achieve the results of attenuating the low frequency "buzzsaw" noise along with effectively attenuating medium and high frequency sound without departing from the scope of the invention as claimed herein.

Changes may be made in the construction and arrangement of the parts or elements of the embodiments as described herein without departing from the spirit or scope of the invention defined in the following claims.

I claim:

1. A sound attenuating panel for installation in the high velocity air flow region of an engine nacelle and other applications requiring acoustic treatment, the panel comprising:
- a single layer of cellular honeycomb core;
- a first sheet of permeable facing material attached to the top surface of the core;
- a first acoustic perforated septum formed internally in the core and parallel to the first sheet, the first septum made up of a plurality of strips having a width $W_1$ and gap $G_1$ therebetween;
- a second acoustic septum formed internally in the core and parallel to the first septum, the second septum disposed in a spaced relationship below the first septum and made up of a plurality of strips having a width $W_2$ and gap $G_2$ therebetween, the width $W_2$ of the second septum being greater than the gap $G_1$ with the strips of the second septum indexed below the gaps $G_1$ of the first septum.

2. The panel as described in claim 1 further including a second sheet of facing material attached to the bottom surface of the core thereby forming an acoustic structural sandwich.

3. The panel as described in claim 1 wherein the strips of the second septum are perforated.

4. The panel as described in claim 1 wherein the distance between the second septum and the bottom surface of the core is greater than the distance between the second septum and the top surface of the core.

5. A sound attenuating panel for installation in the high velocity air flow region of an engine nacelle and other applications requiring acoustic treatment, the panel comprising:
- a single layer of cellular honeycomb core;
- a first sheet of permeable facing material attached to the top surface of the core;
- a first acoustic septum formed internally in the core and parallel to the first sheet, the first septum disposed in a spaced relationship below the sheet, the first acoustic septum made up of a plurality of strips having a width $W_1$ and gap $G_1$ therebetween; and
- a second acoustic septum formed internally in the core and parallel to the first septum, the second septum disposed in a spaced relationship below the first septum, the second septum having a width $W_2$ greater than the gap $G_1$ with the second septum indexed below the gap $G_1$ of the first septum.

* * * * *